(12) United States Patent
Merino Vazquez et al.

(10) Patent No.: US 12,414,011 B2
(45) Date of Patent: Sep. 9, 2025

(54) SUBSCRIBER'S DATA NODE, SERVING NODE, EXPOSURE FUNCTION NODE AND METHODS IN A COMMUNICATIONS NETWORK

(71) Applicant: Telefonaktiebolaget LM Ericsson (PUBL), Stockholm (SE)

(72) Inventors: Emiliano Merino Vazquez, Madrid (ES); Carmen Bartolome Clemente, Madrid (ES); Pablo Acevedo Montserrat, Galapagar (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 423 days.

(21) Appl. No.: 17/595,233

(22) PCT Filed: Jul. 5, 2019

(86) PCT No.: PCT/EP2019/068072
§ 371 (c)(1),
(2) Date: Nov. 11, 2021

(87) PCT Pub. No.: WO2020/244785
PCT Pub. Date: Dec. 10, 2020

(65) Prior Publication Data
US 2022/0217584 A1  Jul. 7, 2022

(30) Foreign Application Priority Data
Jun. 3, 2019 (EP) .................................. 19382455

(51) Int. Cl.
*H04W 28/10* (2009.01)
*H04L 47/2483* (2022.01)
(52) U.S. Cl.
CPC ......... *H04W 28/10* (2013.01); *H04L 47/2483* (2013.01)

(58) Field of Classification Search
CPC .... H04W 28/10; H04W 4/70; H04L 47/2483; H04L 47/2441
See application file for complete search history.

(56) References Cited

U.S. PATENT DOCUMENTS

2018/0324060 A1  11/2018  Chaponniere et al.
2019/0007329 A1  1/2019  Velev et al.
(Continued)

OTHER PUBLICATIONS

3GPP TS 23.682 v16.3.0; Technical Specification; 3rd Generation Partnership Project; Technical Specification Group Services and System Aspects; Architecture enhancements to facilitate communications with packet data networks and applications (Release 16)—Jun. 2019.
(Continued)

*Primary Examiner* — Syed Ali
*Assistant Examiner* — Najeeb Ansari
(74) *Attorney, Agent, or Firm* — Sonoda & Kobayashi Intellectual Property Law; Sarvajit S. Patil

(57) ABSTRACT

A method performed by a subscriber's data node for differentiating Non-IP Data Delivery, NIDD, traffic in a communication network. The communication network comprises the subscriber's data node, a serving node and an exposure function node. The subscriber's data node receives, from the exposure function node, a NIDD authorization request comprising a first identifier. The first identifier comprises any one out of a service capability server identifier, an application server identifier and an application function identifier. The subscriber's data node generates a non-IP flow description, based on the received first identifier. The non-IP flow description comprises an application identifier and a non-IP flow identifier for the NIDD authorization. The subscriber's data node transmits the non-IP flow description towards the serving node. The subscriber's data node transmits a NIDD
(Continued)

authorization response comprising the non-IP flow identifier, towards the exposure function node.

11 Claims, 15 Drawing Sheets

(56) References Cited

U.S. PATENT DOCUMENTS

| | | | | |
|---|---|---|---|---|
| 2019/0159077 A1* | 5/2019 | Ryu | ..................... | H04W 8/04 |
| 2019/0306753 A1* | 10/2019 | Uchida | ................ | H04W 28/04 |
| 2020/0322881 A1* | 10/2020 | Lee | ..................... | H04W 4/70 |
| 2020/0359213 A1* | 11/2020 | Huang | ................ | H04W 12/06 |
| 2021/0274575 A1* | 9/2021 | Talebi Fard | .......... | H04W 76/12 |

OTHER PUBLICATIONS

PCT International Search Report issued for International application No. PCT/EP2019/068072—Jan. 21, 2020.

PCT Written Opinion of the International Searching Authority issued for International application No. PCT/EP2019/068072—Jan. 21, 2020.

* cited by examiner

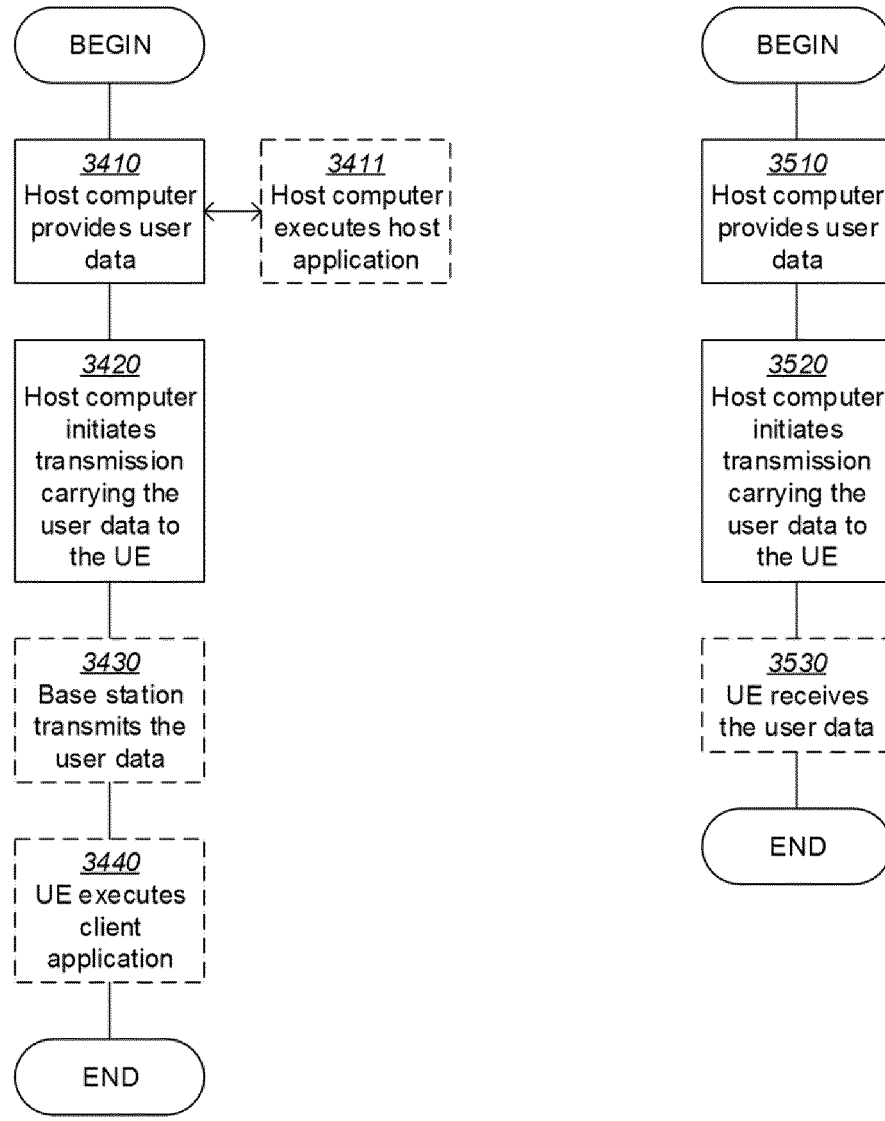

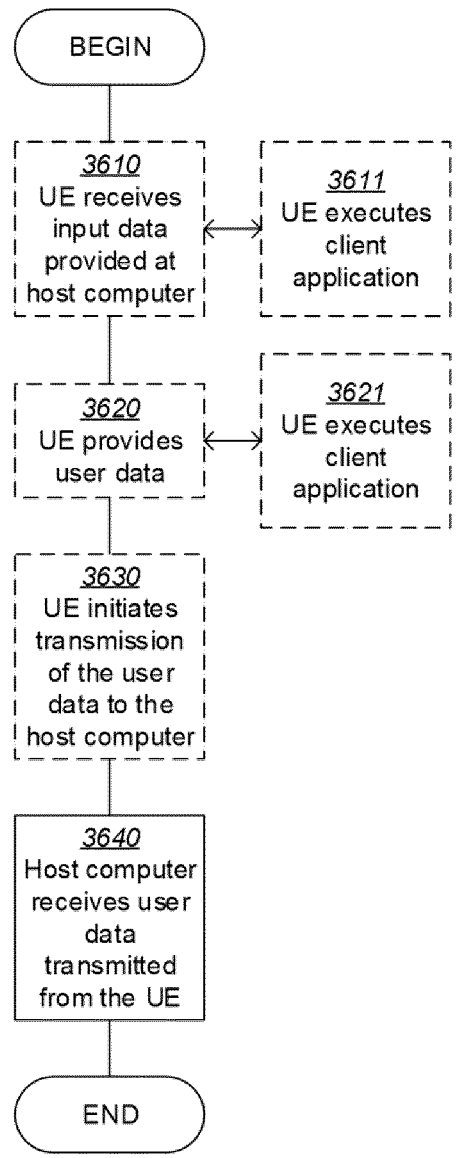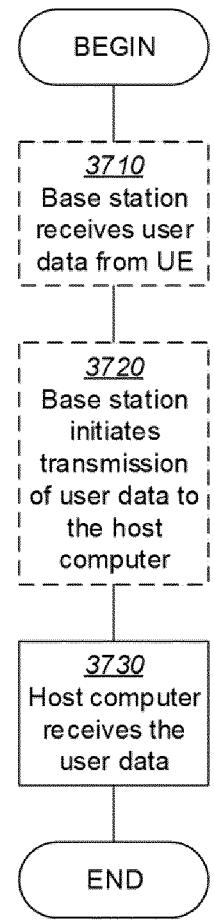
Fig. 15
Fig. 16

SUBSCRIBER'S DATA NODE, SERVING NODE, EXPOSURE FUNCTION NODE AND METHODS IN A COMMUNICATIONS NETWORK

PRIORITY

This nonprovisional application is a U.S. National Stage Filing under 35 U.S.C. § 371 of International Patent Application Serial No. PCT/EP2019/068072 filed Jul. 5, 2019 and entitled "SUBSCRIBER'S DATA NODE, SERVING NODE, EXPOSURE FUNCTION NODE AND METHODS IN A COMMUNICATIONS NETWORK" which claims priority to European Patent Application No. 19 382 455.4 filed Jun. 3, 2019 both of which are hereby incorporated by reference in their entirety.

TECHNICAL FIELD

Embodiments herein relate to a subscriber's data node, a serving node, an exposure function node and methods therein. In particular, they relate to differentiating Non-Internet Protocol (IP) Data Delivery (NIDD) traffic in a communication network.

BACKGROUND

In a typical wireless communication network, wireless devices, also known as communication devices, mobile stations, stations (STA) and/or User Equipment (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to Radio Network Controllers (RNCs) used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

The demand for Machine-to-Machine (M2M) and Internet of Things (IoT) communications is growing fast. The IoT is a network of physical objects referred to as devices or "things" embedded with electronics, software, sensors and connectivity to enable it to achieve greater value and service by exchanging data with a manufacturer, an operator and/or other connected devices. Each thing is uniquely identifiable through its embedded computing system and is able to be interoperated within the existing Internet infrastructure. Typically, IoT is expected to offer advanced connectivity of devices, systems, and services that goes beyond M2M communications and covers a variety of protocols, domains, and applications. Things, in the IoT, may refer to a wide variety of devices such as heart monitoring implants, biochip transponders on farm animals, electric clams in coastal waters, automobiles with built-in sensors, or field operation devices that assist fire-fighters in search and rescue. These devices collect useful data with the help of various existing technologies and then autonomously flow the data between other devices. Current market examples include smart thermostat systems, washer and/or dryers that utilize WiFi for remote monitoring. IoT is expected to generate large amounts of data from diverse locations that are aggregated at a very high-velocity, thereby increasing the need to better index, store and process such data.

Cellular Internet of Things (CIoT) is a technology which involves Machine-Type Communication (MTC) devices so that a telecommunications operator may provide their network to other parties and/or companies for different applications. An example of such an application is the use of smart-metering readers, in which an MTC device may be placed in different locations and start sending and receiving data on a regular basis, e.g. electricity consumption reports and water-levels. This information may require that a given MTC provider, e.g. electricity company, exchanges information via NIDD with the different devices through a Service Capability Exposure Function (SCEF) in 4G or Network Exposure Function (NEF) in 5G.

These MTC providers may make use of Service Capability Servers (SCSs), Application Servers (ASs) and Application Functions (AFs) to request, collect and manage application data, e.g. water temperature levels. In order to achieve this, a software application, i.e. an MTC application, may be installed in the MTC device, e.g. water temperature meter. The AF and/or AS may also be installed with a software application, i.e. an MTC application, to request, collect, interpret and post-process these data.

Quality of Service (QoS) is something that should be ensured for an AS and/or AF, owned by an MTC provider for electricity collection from MTC devices installed at users' home, as the application in the MTC device may require prioritization for NIDD. For example, in the case of a network overload or an outage, an electricity consumption request from an AS or AF, owned by e.g. MTC provider X, might not be as critical as gas level measurements in a user's home requested by the same AF or AS. Hence, the network should ensure this traffic differentiation per MTC provider and service, e.g. electricity consumption, gas level and temperature level. Moreover, the type of application data exchanged may have different requirements when it comes to network latency, i.e. the gas level should be read and sent with a very small delay, almost in real time, whereas the electricity reports may be queued in the device and/or the network and sent later since they are not so urgent to be post-processed by the MTC application in the AF and/or AS owned by the MTC provider.

As described above, this application data, such as water levels, temperature levels and gas levels, is exchanged via NIDD.

The concept of non-IP data traffic is unstructured from the 3rd Generation Partnership Project (3GPP) packet core network in 4G and 5G, as described in TS 23.682, chapter 4.5.14.1. This means that there may be no way to identify a traffic flow from an MTC application in the AS and/or AF towards an MTC device and vice versa. As the identification of traffic flow is made with IP-based traffic, e.g. based on a source-destination IP address, the serving node, e.g. Session Management Function (SMF) in 5G and MME in 4G, may not be capable to perform traffic differentiation for several applications in the same MTC device. E.g. priority, importance and quality of the data delivered for a smart meter device to read water temperature levels may not require the same treatment as for reading cleaning levels.

An example of IP-based traffic is described as follows: all IP packets from IP address 1.1.1.1 towards IP address 2.2.2.2 are identified by the network as "service X", since the IP packets are understood by the network elements by examining the structured data, also known as IP datagram, and the source and/or destination IP address in the IP packets, e.g. source IP address 2.2.2.2 may identify MTC provider X and gas level MTC application. This identification is not possible for non-IP data, since there are no recognizable headers, such as IP addresses from the origin and destination of the data being sent and/or received. Hence, the network elements may not identify which type of data that is exchanged and how it should be handled by each node.

SUMMARY

There is no mechanism to ensure QoS for the NIDD traffic, since it is conveyed from an exposure function node, such as a SCEF, on to the MTC device via a serving node, such as a Mobility Management Entity (MME). In short, the serving node is not able to differentiate NIDD traffic from the MTC applications in order to ensure the right QoS, latency required, criticality of the data to be exchanged and traffic prioritization for the type of data exchanged.

An object of embodiments herein is to handle communication of NIDD traffic in a communication network.

According to a first aspect of embodiments herein, the object is achieved by a method performed by a subscriber's data node for differentiating Non-IP Data Delivery, NIDD, traffic in a communication network. The communication network comprises the subscriber's data node, a serving node and an exposure function node. The subscriber's data node receives, from the exposure function node, a NIDD authorization request comprising a first identifier. The first identifier comprises any one out of a service capability server identifier, an application server identifier and an application function identifier. The subscriber's data node generates a non-IP flow description, based on the received first identifier. The non-IP flow description comprises an application identifier and a non-IP flow identifier for the NIDD authorization. The subscriber's data node transmits the non-IP flow description towards the serving node. The subscriber's data node transmits a NIDD authorization response comprising the non-IP flow identifier, towards the exposure function node.

According to a second aspect of embodiments herein, the object is achieved by a method performed by a serving node for differentiating Non-IP Data Delivery, NIDD, traffic in a communication network. The communication network comprises a subscriber's data node, the serving node and an exposure function node. The serving node receives a non-IP flow description from the subscriber's data node. The non-IP flow description comprises an application identifier and a non-IP flow identifier. The serving node associates the application identifier and the non-IP flow identifier as an authorized non-IP flow description. The serving node receives, from the exposure function node, a corresponding NIDD submission request with non-IP data and a non-IP flow identifier. The serving node determines an application identifier associated with the non-IP flow identifier. The serving node applies a non-IP traffic policy configured for the application identifier to the non-IP data.

According to a third aspect of embodiments herein, the object is achieved by a method performed by a exposure function node for differentiating Non-IP Data Delivery, NIDD, traffic in a communication network. The communication network comprises a subscriber's data node, a serving node and the exposure function node. The exposure function node receives, from an application node, a NIDD configuration request comprising a first identifier. The first identifier comprises any one out of a service capability server identifier, an application server identifier and an application function identifier. The exposure function node transmits a NIDD authorization request comprising the first identifier towards the subscriber's data node. The exposure function node receives, from the subscriber's data node, a NIDD authorization response comprising a non-IP flow identifier. The exposure function node associates the non-IP flow identifier received in the NIDD authorization response with the first identifier transmitted in the NIDD authorization request. The exposure function node receives, from the application node, a NIDD submission request with non-IP data and the first identifier. The exposure function node transmits, towards the serving node, a corresponding NIDD submission request with the non-IP data and the non-IP flow identifier associated with the first identifier.

According to a fourth aspect of embodiments herein, the object is achieved by a subscriber's data node configured to differentiate Non-IP Data Delivery, NIDD, traffic in a communication network. The communication network is adapted to comprise the subscriber's data node, a serving node and an exposure function node. The subscriber's data node is configured to receive, from the exposure function node, a NIDD authorization request comprising a first identifier. The first identifier is adapted to comprise any one out of a service capability server identifier, an application server identifier and an application function identifier. The subscriber's data node is configured to generate a non-IP flow description, based on the received first identifier. The non-IP flow description is adapted to comprise an application identifier and a non-IP flow identifier for the NIDD authorization. The subscriber's data node is configured to transmit the non-IP flow description towards the serving node. The subscriber's data node is configured to transmit a NIDD authorization response comprising the non-IP flow identifier towards the exposure function node.

According to a fifth aspect of embodiments herein, the object is achieved by a serving node configured to differentiate Non-IP Data Delivery, NIDD, traffic in a communication network. The communication network is adapted to comprise a subscriber's data node, the serving node and an exposure function node. The serving node is configured to receive a non-IP flow description from the subscriber's data node. The non-IP flow description is adapted to comprise an application identifier and a non-IP flow identifier. The serving node is configured to associate the application identifier and the non-IP flow identifier as an authorized non-IP flow description. The serving node is configured to receive, from the exposure function node, a corresponding NIDD submission request with non-IP data and a non-IP flow identifier. The serving node is configured to determine an application identifier associated with the non-IP flow identifier. The serving node is configured to apply a non-IP traffic policy configured for the application identifier to the non-IP data.

According to a sixth aspect of embodiments herein, the object is achieved by an exposure function node configured to differentiate Non-IP Data Delivery, NIDD, traffic in a communication network. The communication network is adapted to comprise a subscriber's data node, a serving node and the exposure function node. The exposure function node is configured to receive, from an application node, a NIDD configuration request comprising a first identifier. The first identifier is adapted to comprise any one out of a service capability server identifier, an application server identifier and an application function identifier. The exposure function node is configured to transmit a NIDD authorization request comprising the first identifier towards the subscriber's data node. The exposure function node is configured to receive, from the subscriber's data node, a NIDD authorization response comprising a non-IP flow identifier. The exposure function node is configured to associate the non-IP flow identifier received in the NIDD authorization response with the first identifier transmitted in the NIDD authorization request. The exposure function node is configured to receive, from the application node, a NIDD submission request with non-IP data and the first identifier. The exposure function node is configured to transmit, towards the serving node, a corresponding NIDD submission request with the non-IP data and the non-IP flow identifier associated with the first identifier.

With the realisation that by generating a non-IP flow description, comprising an application identifier and a non-IP flow identifier, and allowing to associate and identify data specifically per application in the same communication device, e.g. MTC device, the serving node will be able to perform traffic differentiation for several applications in the same communication device. Thereby the object of differentiating NIDD traffic is enabled.

BRIEF DESCRIPTION OF THE DRAWINGS

Examples of embodiments herein are described in more detail with reference to attached drawings in which:

FIGS. 13 to 16 are flowcharts illustrating methods implemented in a communication system including a host computer, a base station and a user equipment.

DETAILED DESCRIPTION

An example of embodiments herein provides a mechanism for handling communication of NIDD traffic in a communication network, i.e. differentiating between MTC applications in the same communication device, e.g. MTC device such as a smart meter, a sensor for temperature, air pollution and water level. Differentiating of NIDD traffic may be e.g. QoS, traffic prioritization and/or classification. By identifying the type of traffic, i.e. by identifying data specifically per application in the same MTC device, the serving node may apply different treatment for prioritization and QoS.

This is achieved by introducing the concept of a non-IP flow description, which is used to apply different non-IP traffic treatment in the serving node.

Figure 1:
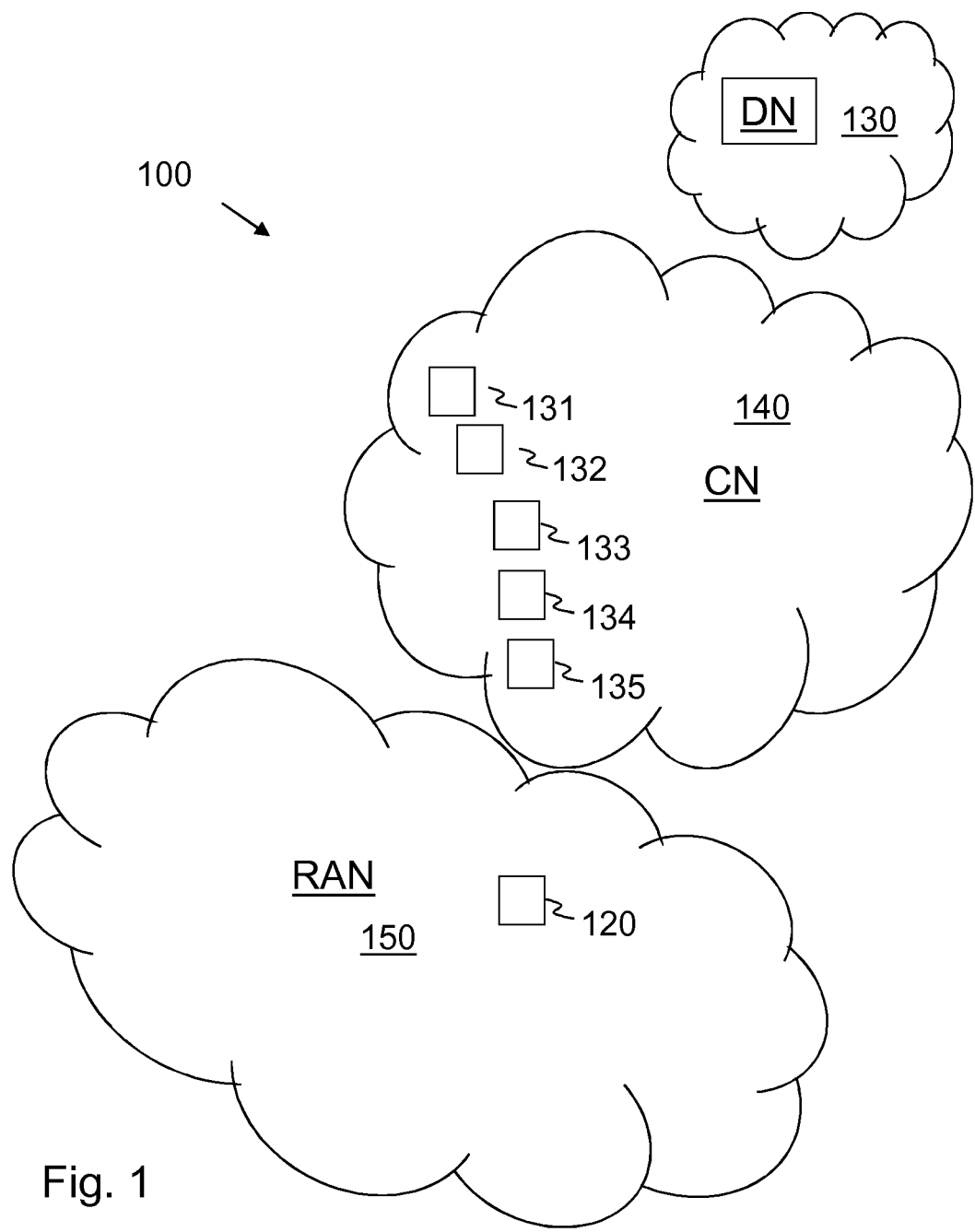
FIG. 1 is a schematic block diagram illustrating embodiments of a communications network.

FIG. 1 is a schematic overview depicting a communications network 100 wherein embodiments herein may be implemented. The communication network 100 comprises communication devices e.g. a communication device 120, such as a mobile station, a UE, a non-access point (non-AP) STA, a STA, a wireless device and/or a wireless terminal, It should be understood by those skilled in the art that "UE" is a non-limiting term which means any terminal, wireless communication terminal, user equipment, Machine Type Communication (MTC) device, Internet of Things operable device, Device to Device (D2D) terminal, mobile device e.g. smart phone, laptop, mobile phone, sensor, relay, mobile tablets or any device communicating within a cell or service area.

Network nodes operate in the core network, such as a subscriber's data node 131, a serving node 132, an exposure function node 133 and application nodes 134 and 135.

The subscriber's data node 131 may e.g. be a HSS or UDM. These functions may store subscriber profiles with identities, security keys and information about each subscriber's services.

The serving node 132 may e.g. be a MME or SMF. These network functions will establish, modify and release data session between the communication device 120 and an external data network.

The exposure function node 133 may e.g. be a SCEF or NEF which supports exposure of capabilities and events.

The application nodes 134 and 135 may e.g. be an MTC application in an AS, AF or SCC.

There are network nodes (not the ones cited above) providing radio coverage over a geographical area by means of antenna beams. The geographical area may be referred to as a cell, a service area, beam or a group of beams. These network nodes may in this case be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within the cell 11 served by the radio network node 110 depending e.g. on the radio access technology and terminology used.

The methods according to embodiments herein are performed by the network nodes which may be any one out of the subscriber's data node 131, the serving node 132 and the exposure function node 133.

The communications network 100 may use 5G NR but may further use a number of other different technologies, such as, Wi-Fi, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

The communication network 100 comprises one or more CNs 140 and one or more RANs 150. The communication devices 120 are connected via one or more RANs 150, to the one or more CNs 140.

As an alternative, a Distributed Node (DN) and functionality, e.g. comprised in a cloud 130 as shown in FIG. 1 may be used for performing or partly performing the methods.

An example scenario of the mechanism for differentiating between MTC applications in the same communication device 120, according to embodiments herein, is that an MTC application in the application node 134 requests, via the exposure function node 133, for NIDD authorization for a service towards the subscriber's data node 131. The NIDD authorization comprises a first identifier and the subscriber's data node 131 identifies the service, based on e.g. the first identifier, and generates an IP-flow description. The IP-flow description comprises an application identifier and a non-IP flow identifier, e.g. a unique flow ID, and passes it on to the serving node 132, e.g. the MME. The service may be e.g. to request, collect, interpret and post-process data. The application identifier is derived from the identifier of the application node 134, e.g. AF, AS or SCS via a new configuration in the subscriber's data node 131, e.g. HSS or UDM, whereas the non-IP flow identifier is globally unique in time.

In the authorization response, the subscriber's data node 131 returns the non-IP flow identifier to the exposure function node 133. The non-IP flow identifier is sent to exposure function node 133, but not forwarded to the AF so that it is included by the exposure function node 133 in every non-IP data sent by the MTC application. In this way, the serving node 132 is able to identify the flow, i.e. traffic, and associate it to an application identifier. The application identifier is then mapped to a set of QoS parameters via a new configuration in the serving node. The QoS parameters may be priority and/or criticality based on the service.

In short, given that the non-IP data does not contain any structured data to identify the flow and apply QoS characteristics, it is the subscriber's data node 131, e.g. HSS or UDM that generates the proper structured data, via the non-IP flow identifier and the application identifier, so that it may be added by the exposure function node 133 when it sends non-IP data, since the exposure function node stores a relationship between the first identifier and the non-IP flow identifier. And as a result, the NIDD traffic may be associated to a specific MTC application and apply the most suitable treatment.

Figure 3:
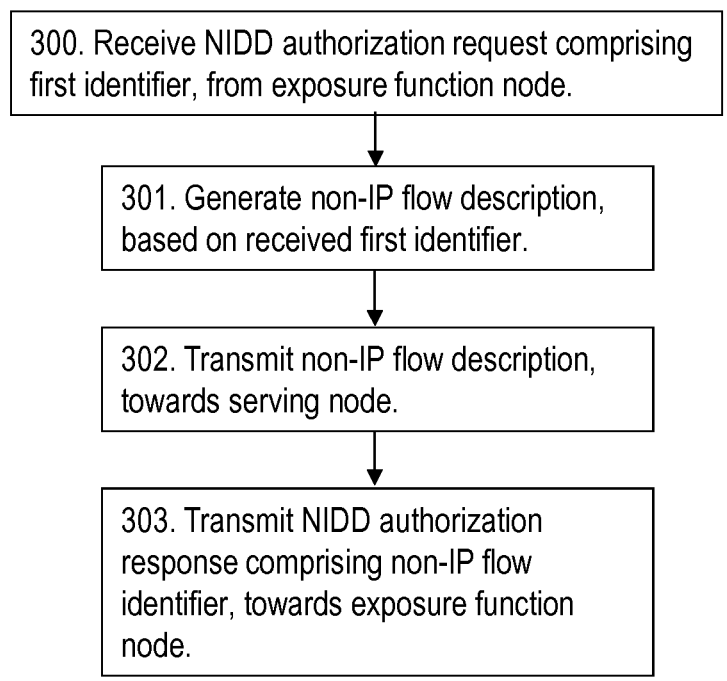
FIG. 3 is a flowchart depicting embodiments of a method in a subscriber's data node.
Figure 4:
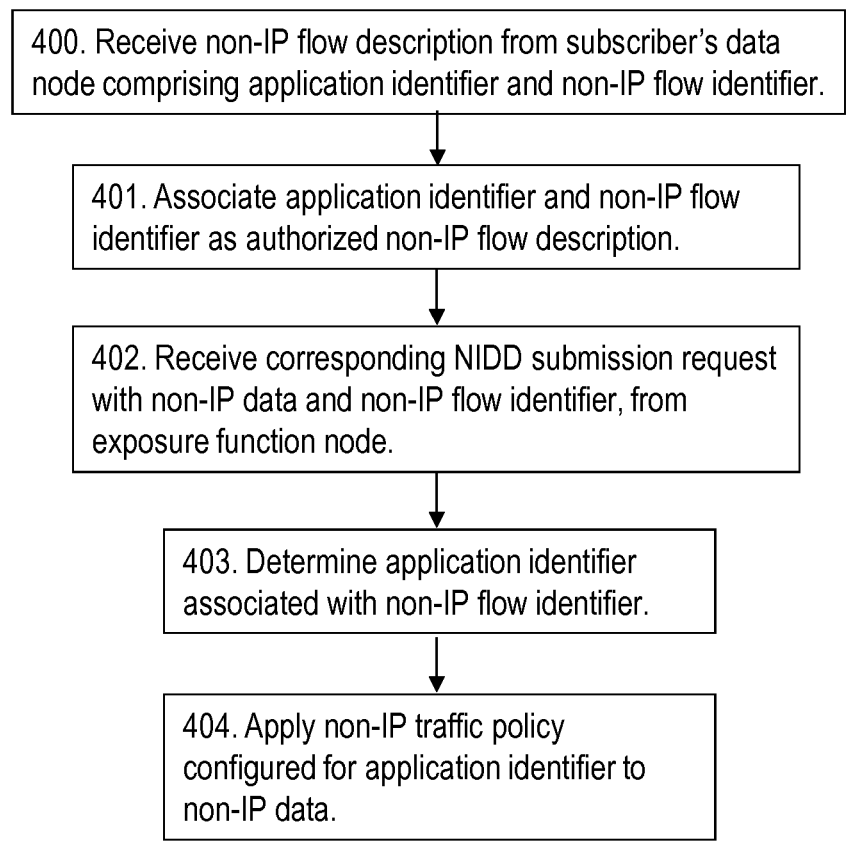
FIG. 4 is a flowchart depicting embodiments of a method in a serving node.
Figure 5:
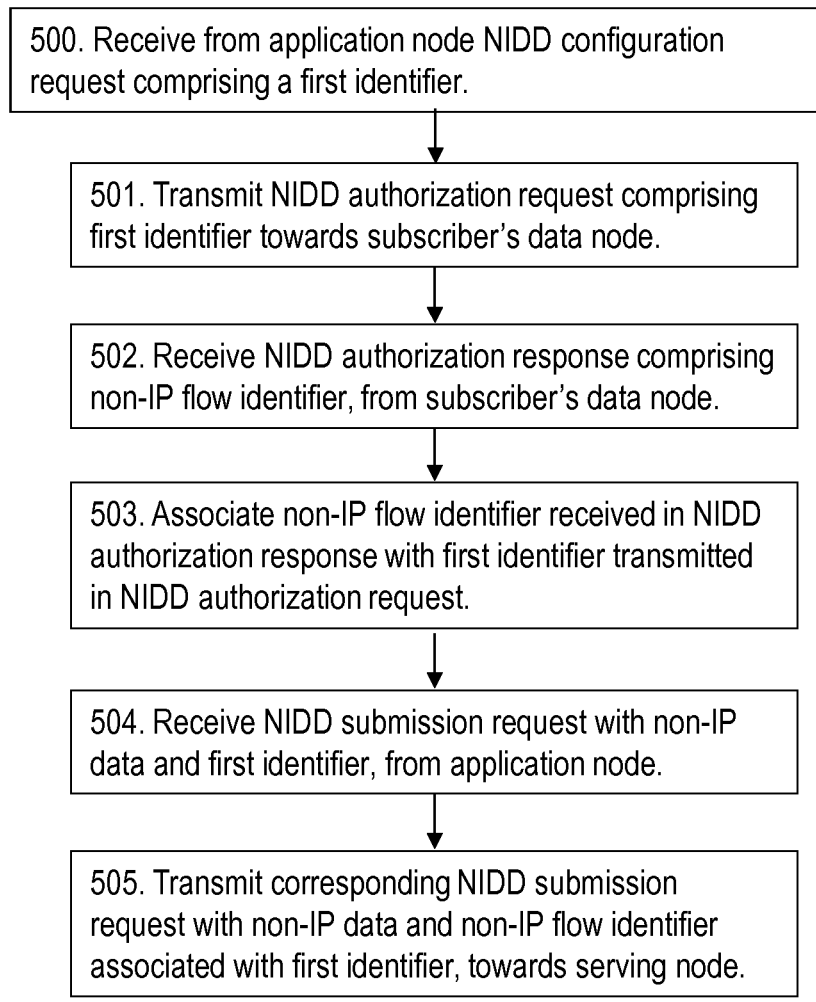
FIG. 5 is a flowchart depicting embodiments of a method in an exposure function node.

A method for differentiating NIDD traffic in a communication network 100 will first be described in a helicopter view with reference to FIG. 2, thereafter the method will be described from the view of the subscriber's data node 131, serving node 132 and exposure function node 133 respectively with reference to FIGS. 3-5 one by one.

Figure 2:
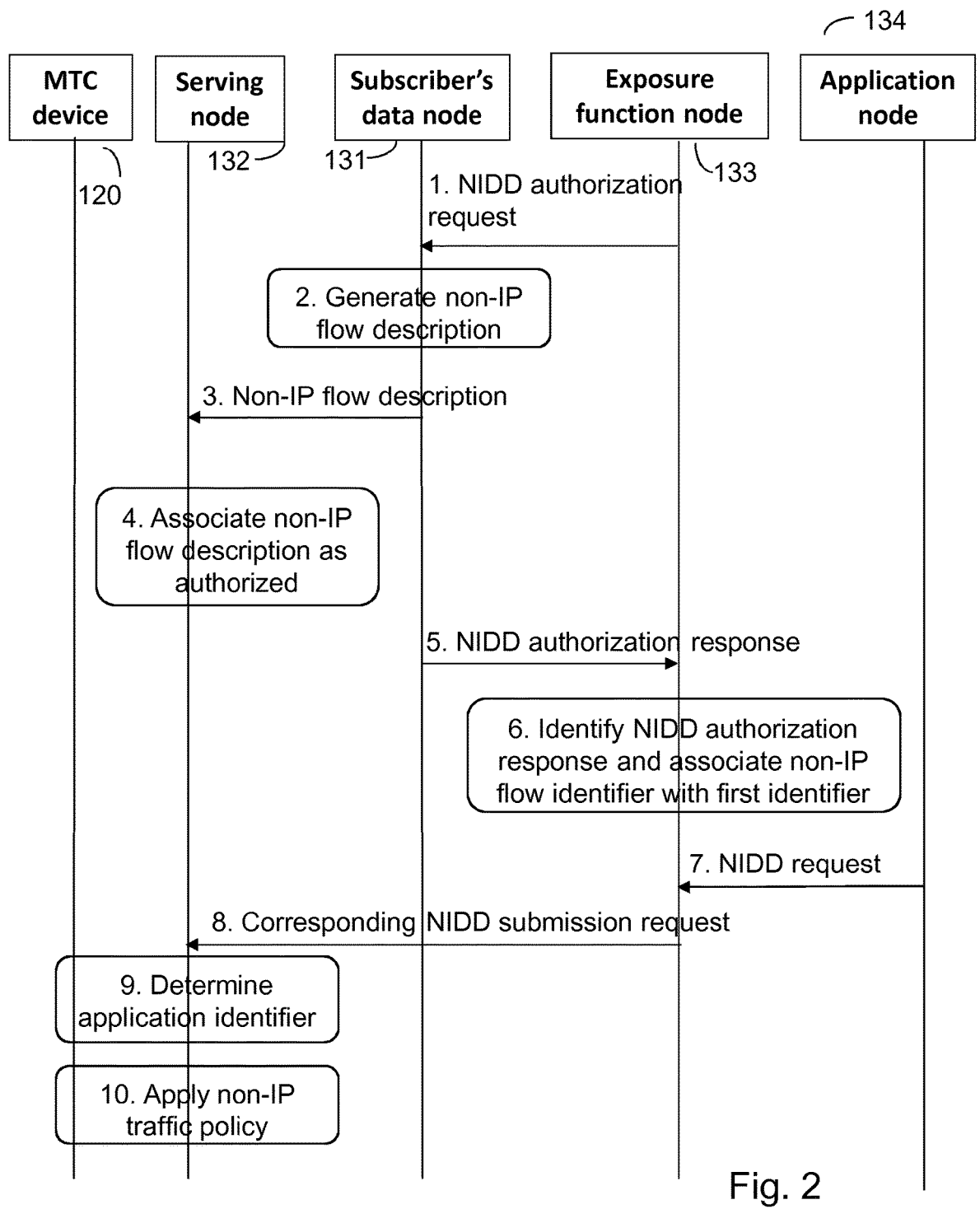
FIG. 2 is a combined signalling scheme and flowchart according to some embodiments herein.

FIG. 2 is a combined signalling scheme and flowchart of an example of a method according to some embodiments herein. The method e.g. comprises the following steps:

Step 1. The subscriber's data node 131 receives, from the exposure function node 133, a NIDD authorization request with a first identifier. The first identifier comprises any one out of a service capability server identifier, an application server identifier and an application function identifier.

Step 2. The subscriber's data node 131 then generates a non-IP flow description, based on the first identifier. The non-IP flow description comprises an application identifier and a unique non-IP flow identifier for the NIDD authorization.

Step 3. Then the subscriber's data node 131 transmits, to the serving node 132, the non-IP flow description comprising the application identifier and the non-IP flow identifier.

Step 4. The serving node 132 associates the application identifier and the non-IP flow identifier, as an authorized non-IP flow description. This may be achieved by storing the association between the non-IP flow identifier and the application identifier received, so that when NIDD data is received with the non-IP flow identifier, the serving node is able to retrieve the associated application identifier stored during the previous NIDD authorization/configuration procedure.

Step 5. The subscriber's data node 131 will then transmit a NIDD authorization response comprising the non-IP flow identifier, to the exposure function node 133. Only the non-IP flow identifier, and not the application identifier, is transmitted in the NIDD authorization response because the exposure function node 133 needs to store this non-IP flow identifier and associate it to the MTC Application, i.e. to the first identifier, which originated the NIDD authorization in first place.

Step 6. The exposure function node 133 identifies the previously transmitted NIDD authorization request corresponding to the NIDD authorization response and associates the non-IP flow identifier received in the NIDD authorization response with the first identifier which was previously transmitted in the NIDD authorization request.

Step 7. The exposure function node 133 receives, from the application node 134, a NIDD request comprising non-IP data and the first identifier.

Step 8. The exposure function node 133 then transmits, to the serving node 132, a corresponding NIDD submission request. The corresponding NIDD submission request comprises the non-IP data and also the non-IP flow identifier which was previously associated with the first identifier.

Step 9. The serving node 132 determines the application identifier associated with the non-IP flow identifier.

Step 10. Finally the serving node 132 applies a non-IP traffic policy, configured for the application identifier, to the non-IP data.

These steps will be further described more in detail below.

Example embodiments of a method performed by the subscriber's data node 131 for differentiating NIDD traffic in a communication network 100 will now be described with reference to a flowchart depicted in FIG. 3. The subscriber's data node 131, the serving node 132 and the exposure function node 133 operate in the communication network 100.

The method comprises the following actions, which actions may be taken in any suitable order.

Action 300

The subscriber's data node 131 receives, from the exposure function node 133, a NIDD authorization request comprising a first identifier. The first identifier comprises any one out of a service capability server identifier, an application server identifier and an application function identifier. The first identifier will later be used for generating a non-IP flow description.

Action 301

The subscriber's data node 131 generates a non-IP flow description, based on the received first identifier. The non-IP flow description comprises an application identifier and a non-IP flow identifier for the NIDD authorization.

The non-IP flow identifier may be a globally unique identifier in the communication network 100.

The application identifier may be derived from a communication provider information. A communication provider information may e.g. be "Company-A" as MTC provider ID and "TV" as a service ID.

The application identifier may be configured per first identifier basis. This may be when there is no communication provider information received, which means that the exposure function node 133 needs to base on the identity of the AF, after authenticating the AF, to derive the provider information.

Action 302

The subscriber's data node 131 then transmits the non-IP flow description, towards the serving node 132.

Action 303

The subscriber's data node 131 transmits a NIDD authorization response comprising the non-IP flow identifier, towards the exposure function node 133. In the authorization response, the subscriber's data node 131 returns the non-IP flow identifier to the exposure function node 133, since subscriber's data node 131 sends the non-IP flow identifier in the response towards the exposure function node 133, but the exposure function node 133 does not forward that info to the application node 134 so that it is included by the exposure function node 133 in every non-IP data sent by the application node 134. In this way, the serving node 132 is able to identify the flow, i.e. traffic, and associate it to an application identifier.

Example embodiments of a method performed by the serving node 132 for differentiating NIDD traffic in the communication network 100 will now be described with reference to a flowchart depicted in FIG. 4. The serving node 132, the subscriber's data node 131, and the exposure function node 133 operate in the communication network 100.

The method comprises the following actions, which actions may be taken in any suitable order.

Action 400

The serving node 132 receives a non-IP flow description from the subscriber's data node 131, wherein the non-IP flow description comprises an application identifier and a non-IP flow identifier.

Action 401

The serving node 132 associates the application identifier and the non-IP flow identifier as an authorized non-IP flow description. The association is needed later on to carry out the step of determining, in action 404. The authorization from this point onwards is done on a per non-IP flow identifier basis, since the application identifier is stored and associated to the non-IP flow identifier, but not signalled, i.e. neither sent or received, any more. Hence, if a non-IP flow identifier is received and there is no association to an application identifier, it means that the flow is not permitted, that is, there is no default QoS policy for an unknown non-IP flow identifier.

Action 402

The serving node 132 receives, from the exposure function node 133, a corresponding NIDD submission request with non-IP data and a non-IP flow identifier. The first identifier is known by the subscriber's data node 131 and the exposure function node 133, but is not received by the serving node 132 as the serving node 132 does not need to know about the first identifier. This is because the serving node 132 only requires to identify the flow, i.e. the non-IP flow identifier, and then fetch the associated application identifier, which is stored locally after the previous authorization phase.

Action 403

The serving node 132 determines an application identifier associated with the non-IP flow identifier. The application identifier is determined by using the received non-IP flow identifier to fetch the application identifier previously associated to the non-IP flow identifier.

Action 404

The serving node 132 applies a non-IP traffic policy configured for the application identifier to the non-IP data.

The non-IP traffic policy may be configured at the serving node 132 per application identifier basis.

The non-IP traffic policy may comprise any one out of application priority during normal condition, application priority during congestion, buffer size in a communication device 120, QoS information, a time of day to allow or block communication, a rate limit for uplink non-IP data and a rate limit for downlink non-IP data.

Example embodiments of a method performed by the exposure function node 133 for differentiating NIDD traffic in the communication network 100 will now be described with reference to a flowchart depicted in FIG. 5. The subscriber's data node 131, the serving node 132 and the exposure function node 133 operate in the communication network 100.

The method comprises the following actions, which actions may be taken in any suitable order.

Action 500

The exposure function node 133 receives, from the application node 134, a NIDD configuration request comprising a first identifier, which first identifier comprises any one out of a service capability server identifier, an application server identifier and an application function identifier.

The application node 134 may be a third party node not belonging to the communication network 100.

Action 501

The exposure function node 133 then transmits a NIDD authorization request comprising the first identifier towards the subscriber's data node 131. Optionally also MTC provider information may be transmitted to the subscriber's data node 131. The MTC provider may be configured as "trusted" in the exposure function node 133, so that the MTC provider information, if included, is to be relied. If not included, then the subscriber's data node 132 may derive the provider information from the AF, SCS, or AS identifier, i.e. the first identifier.

Action 502

The exposure function node 133 receives, from the subscriber's data node 131, a NIDD authorization response comprising a non-IP flow identifier.

In the NIDD authorization response, the subscriber's data node 131 returns the non-IP flow identifier to the exposure function node 133, so that it is included in every non-IP data transmitted by the exposure function node 133. In this way, the serving node 132 is able to identify the traffic, and associate it to an application identifier.

Action 503

The exposure function node 133 thus associates the non-IP flow identifier received in the NIDD authorization response with the first identifier transmitted in the NIDD authorization request.

The exposure function node 133 may transmit a NIDD configuration response towards the application node 134.

Action 504

The exposure function node 133 receives, from the application node 134, a NIDD submission request with non-IP data and the first identifier. The NIDD submission request is used for transmitting non-IP data to the device 120, e.g. this data may be an instruction to the device 120, such as "collect water levels".

Action 505

In order for the serving node 132 to determine an application identifier associated with the non-IP flow identifier and apply a non-IP traffic policy configured for the application identifier to the non-IP data, the exposure function node 133 transmits, towards the serving node 132, a corresponding NIDD submission request with the non-IP data and the non-IP flow identifier associated with the first identifier.

Embodiments herein such as mentioned above will now be further described and exemplified. The text below is applicable to and may be combined with any suitable embodiment described above.

Figure 6:
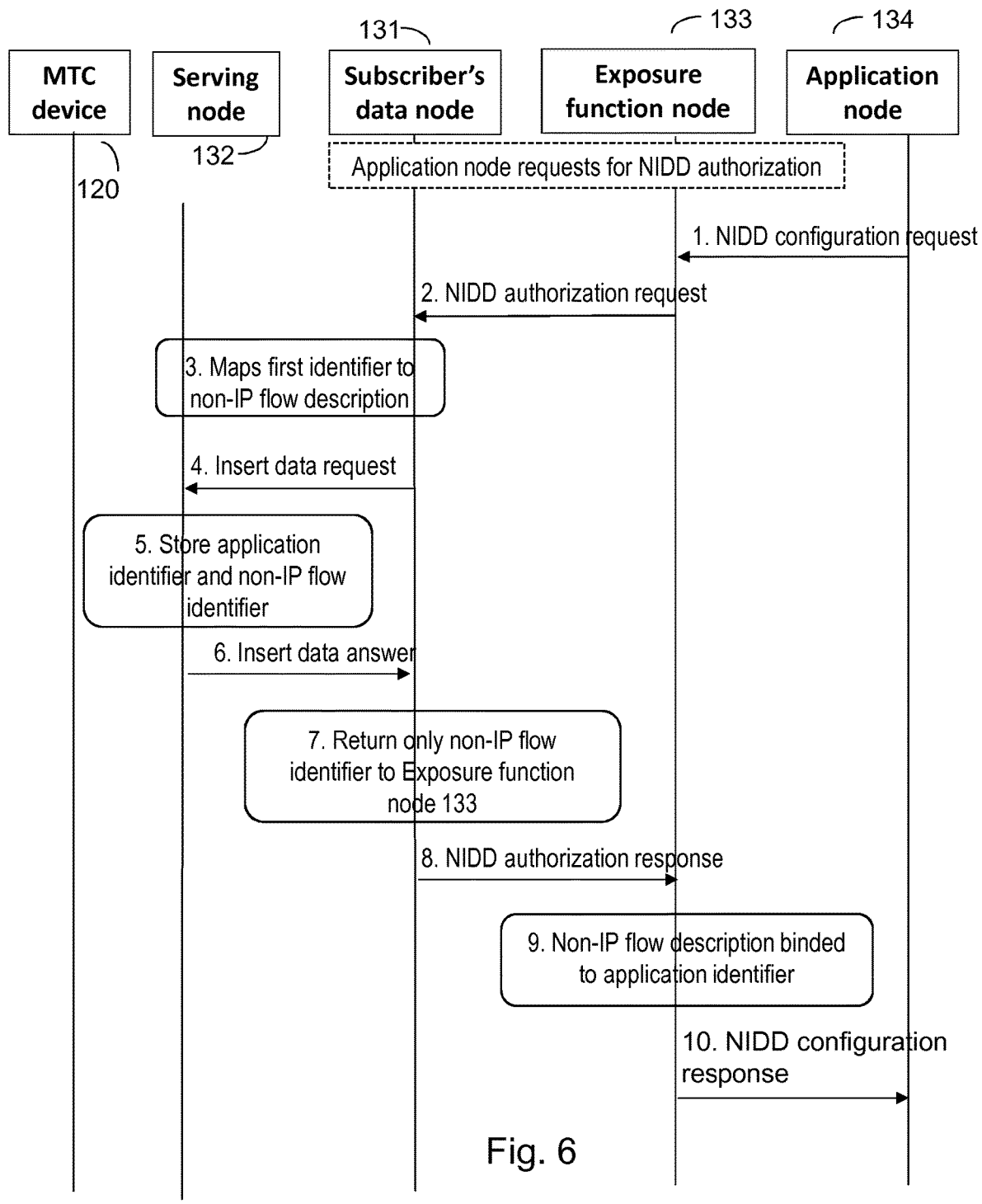
FIG. 6 is a combined signalling scheme and flowchart according to some embodiments herein.

An, example of a method according to some embodiments, is shown in the combined signalling scheme and flowchart of FIG. 6 and comprises the following steps:

Step 1. The application node 134, requests for NIDD configuration, including its first identifier, e.g. AF, SCS, or AS identifier.

Step 2. The exposure function node 133, proxies, i.e. transmits, a NIDD authorization request with the first identifier towards the subscriber's data node 131, and stores the first identifier so that when the response to this NIDD authorization request comes, it may be retrieved.

Steps 3-6. The subscriber's data node 131 may generate a non-IP flow description, based on the first identifier, by allocating a globally unique non-IP flow identifier. Furthermore, an application identifier is included as part of the non-IP flow description. The application identifier may be mapped from the first identifier via configuration in the subscriber's data node 131. The non-IP flow description is passed on to the serving node 132 so that it is aware of that the provided non-IP flow identifier, if received from the exposure function node 133, is authorized. The application identifier is also stored by the serving node 132 so that different QoS policies or priorities may be associated to the non-IP flow, via configuration in the serving node 132. Other information, such as buffer size in the MTC device 120 supporting the service, may also be associated.

An example of configuration of a subscriber's data node 131 for an application identifier is shown in the table below:

| First identifier | Application identifier |
| --- | --- |
| "Company-B AS-1" | "Electricity" |

Example of the non-IP flow description on a globally unique non-IP flow identifier generated=123456:

Non-IP flow description=123456, Electricity.

In the case where the same first identifier is managing multiple applications, the application identifier may be derived from the MTC Provider information, which is described in 3GPP TS 23.682, NOTE 7 in chapter 5.13.2. Either the subscriber's data node 131 may derive the application identifier on a configurable basis, see the table below, or the subscriber's data node 131 may directly use the MTC Provider information in a transparent manner. The configurable option makes it easier to group and/or map different MTC provider information to the same service requiring the same QoS. Otherwise, if the information is passed on in a transparent manner, the serving node 132, needs to have as many QoS local policies configured as applications in the network. In the scenario of thousands or hundreds of applications, this may be non-efficient.

| First Identifier | MTC provider information | Application identifier |
| --- | --- | --- |
| "Company-C Brand-1" | "Company-C" | "Electricity" |
| "Company-D" | "Energy" | "Electricity" |
| "Company-E" | (empty) | "Electricity" |

Steps 7-8. The subscriber's data node 131 returns the allocated non-IP flow identifier to each exposure function node 133 so that they include such information when sending non-IP data towards the communication device 120 such as the MTC device 120 from each application.

Step 9. The exposure function node 133 retrieves the first identifier, which was stored in step 2, and binds it to the non-IP flow identifier received in the response in steps 7-8. This association, i.e. first identifier <-> non-IP flow identifier may be stored by the exposure function node 133 during the lifetime of the NIDD configuration and/or authorization. Hence, for every NIDD data transmitted by the application node 134, the exposure function node 133 will be able to retrieve the non-IP flow identifier associated to the first identifier, which will be added when non-IP data is forwarded towards the serving node 132.

Step 10. The exposure function node 133 removes the non-IP flow identifier before sending the response towards the application node 134.

Figure 7A:
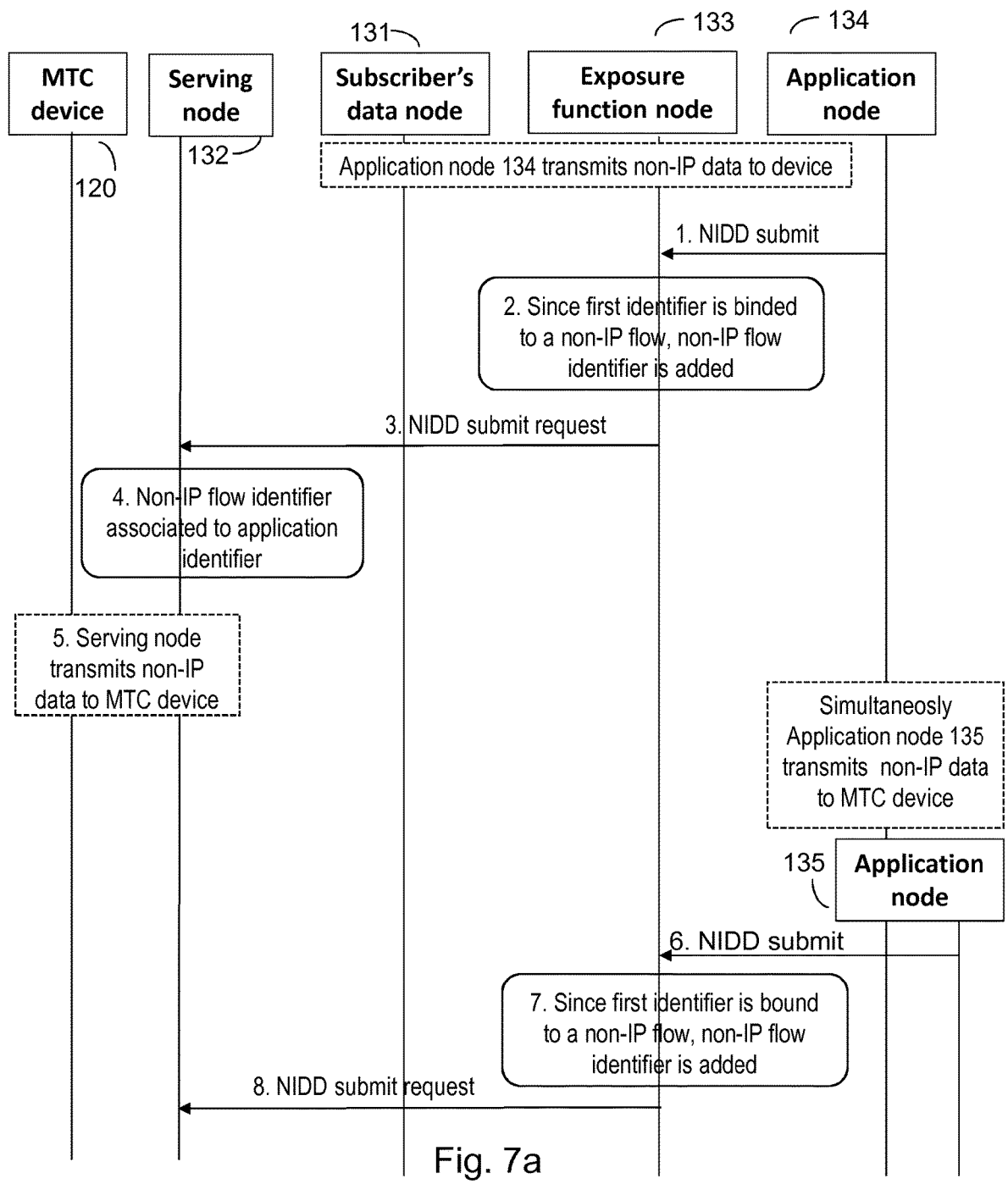
FIGS. 7 a and b are combined signalling schemes and flowcharts according to some embodiments herein.
Figure 7B:
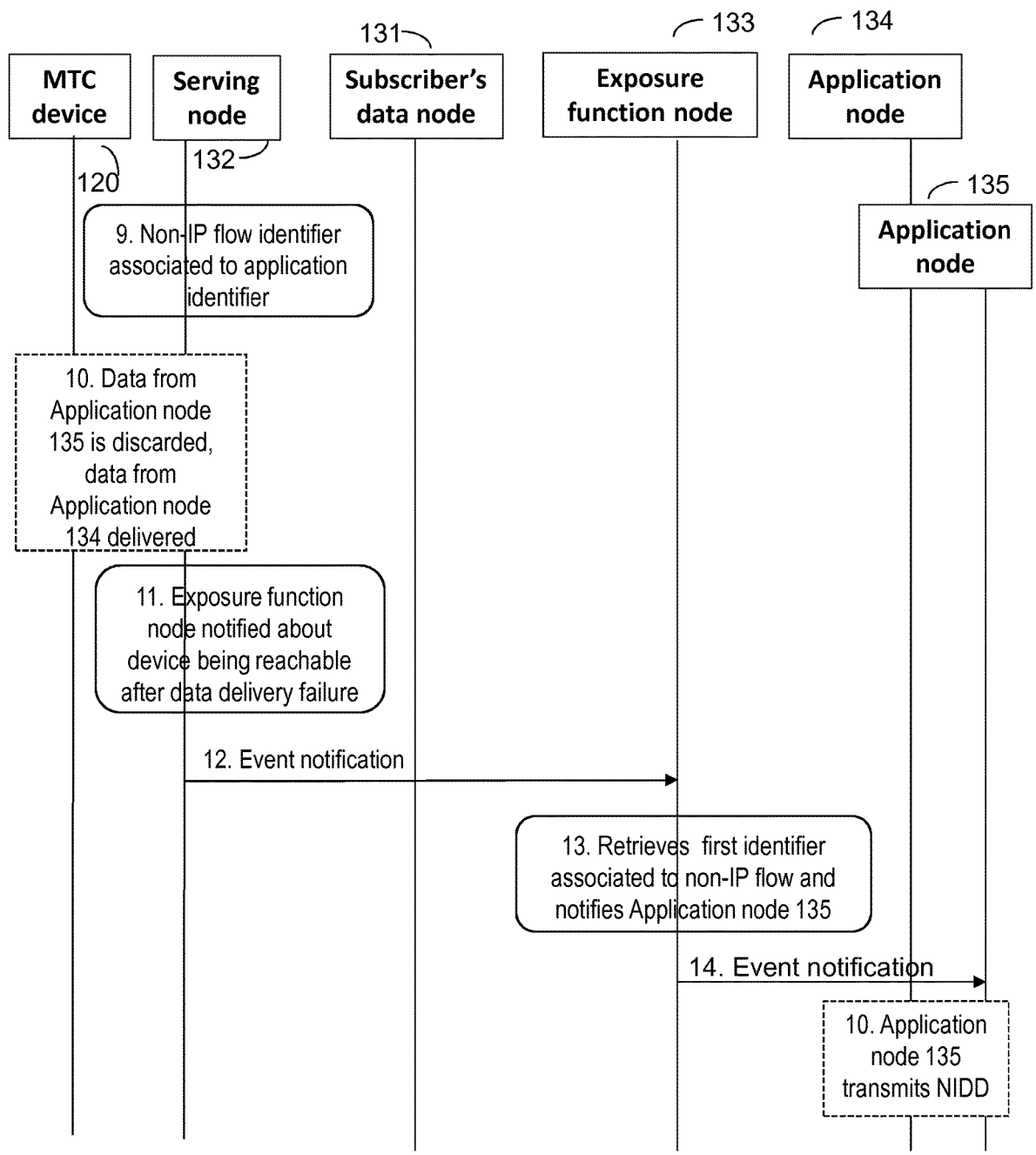

Another example of the method, according to some embodiments, is shown in the combined signalling scheme and flowchart in FIGS. 7a and 7b and comprises the following steps:

Step 1. The application node 134 transmits non-IP data, including a first identifier, e.g. SCS, AS or AF identifier.

Steps 2-3. The exposure function node 133 retrieves the non-IP flow identifier bound previously, see step 9 in FIG. 6, to the first identifier received from the application node 134 and includes the non-IP flow identifier in a NIDD request, together with the non-IP data.

Steps 4-5. The serving node 132 then retrieves the application identifier associated to the received non-IP flow identifier. The application identifier was stored in step 5 during the NIDD authorization in FIG. 6. This allows the serving node 132 to apply different NIDD traffic treatment by fetching the related configuration, which is locally stored in the serving node 132, before transmitting the non-IP data. In this example, the buffer size is checked prior to sending the non-IP data.

Steps 6-8. Simultaneously, another MTC application, such as application node 135, transmits non-IP data to the same MTC device 120.

Steps 9-10. Since both the transmitted non-IP data cannot be delivered at the same time, local policies at the serving node 132 for both the application identifiers instruct the serving node 132 to apply prioritization to the first transmitted application identifier. Non-IP data from application node 135 is discarded.

Steps 11-15. After the non-IP data exchange for the first transmitted application identifier is finished, the serving node 132 notifies about a Downlink Data Notification (DDN) failure. The notification includes the non-IP flow identifier so that the exposure function node 133 may resolve the application identifier to the proper application node due to the association stored in step 9 in FIG. 6.

An example of NIDD QoS local policies for the first transmitted application identifier in the serving node 132 is shown in the table below:

| Application identifier = "Electricity" | Buffer size = o . . . x bytes | Maximum size of the buffer in a given period of time (e.g. 15 seconds) |
|---|---|---|
| | Priority = 0 . . . 15 | Prioritization for the traffic |
| | ToD | Time of day when the MTC applications are not allowed to communicate or give instructions to the device. |
| | Rate limiting | Maximum amount of data that may be sent by the service in a certain period of time. |

Figure 8A:
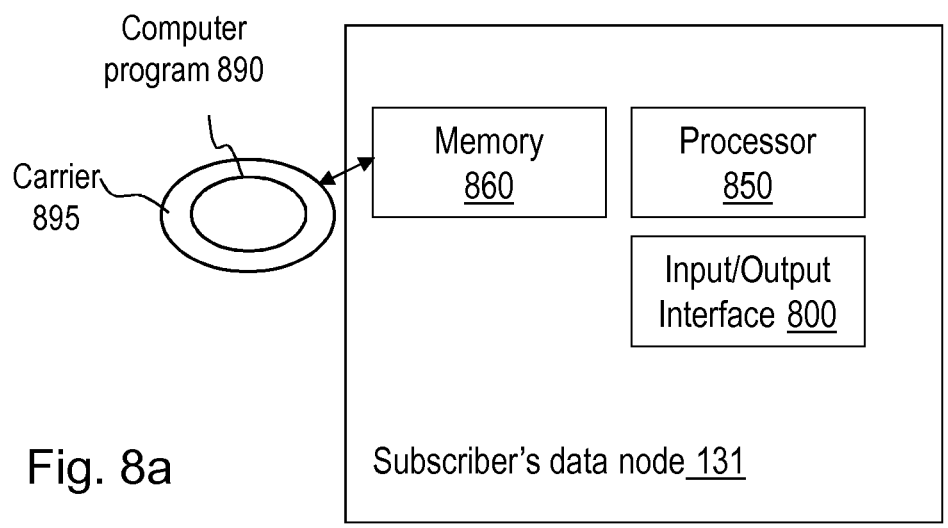
FIGS. 8 a and b are schematic block diagrams illustrating embodiments of a subscriber's data node.
Figure 8B:
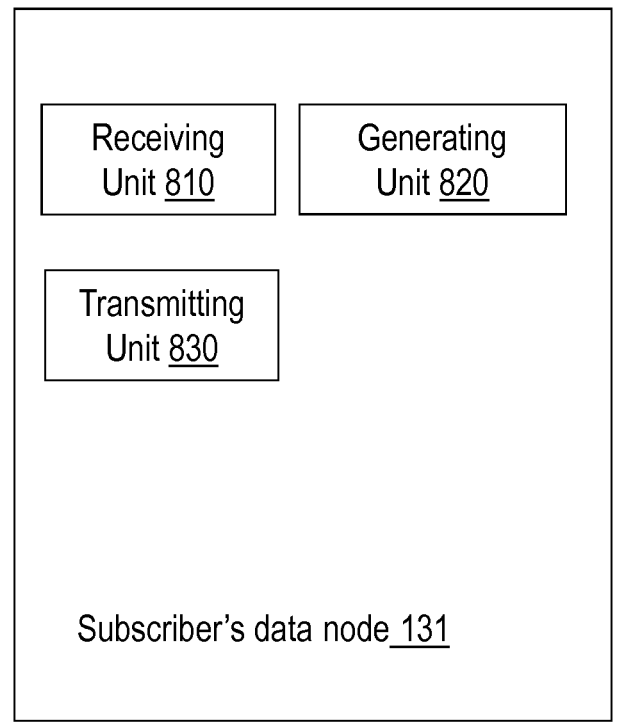

To perform the method actions above for differentiating NIDD traffic in a communication network 100, the subscriber's data node 131 may comprise the arrangement depicted in FIGS. 8a and 8b. As mentioned above, the communication network 100 is adapted to comprise the subscriber's data node 131, a serving node 132 and an exposure function node 133.

The subscriber's data node 131 may comprise an Input and output Interface 800 configured to communicate e.g. with the serving node 132. The input and output interface 800 may comprise a wireless receiver (not shown) and a wireless transmitter (not shown).

The subscriber's data node 131 is configured to, e.g. by means of a receiving unit 810 in the subscriber's data node 131, receive, from the exposure function node 133, a NIDD authorization request comprising a first identifier, which first identifier is adapted to comprise any one out of a service capability server identifier, an application server identifier and an application function identifier.

The subscriber's data node 131 is configured to, e.g. by means of a generating unit 820 in the subscriber's data node 131, generate a non-IP flow description, based on the received first identifier, wherein the non-IP flow description is adapted to comprise an application identifier and a non-IP flow identifier for the NIDD authorization.

The non-IP flow identifier may be a globally unique identifier in the communication network 100.

The application identifier may be derived from a communication provider information.

The application identifier may be configured per first identifier basis.

The subscriber's data node 131 is configured to, e.g. by means of a transmitting unit 830 in the subscriber's data node 131, transmit the non-IP flow description towards the serving node 132.

The subscriber's data node 131 is configured to, e.g. by means of the transmitting unit 830 in the subscriber's data node 131, transmit a NIDD authorization response comprising the non-IP flow identifier towards the exposure function node 133.

The embodiments herein may be implemented through a respective processor or one or more processors, such as a processor 850 of a processing circuitry in the subscriber's data node 131 depicted in FIG. 8a, together with a respective computer program code for performing the functions and actions of the embodiments herein. The program code mentioned above may also be provided as a computer program product, for instance in the form of a data carrier carrying computer program code for performing the embodiments herein when being loaded into the subscriber's data node 131. One such carrier may be in the form of a CD ROM disc. It is however feasible with other data carriers such as a memory stick. The computer program code may furthermore be provided as pure program code on a server and downloaded to the subscriber's data node 131.

The subscriber's data node 131 may further comprise a memory 860 comprising one or more memory units to store data on. The memory comprises instructions executable by the processor 850. The memory 860 is arranged to be used to store e.g. application data, threshold values, data packets, events, data, configurations and applications to perform the methods herein when being executed in the subscriber's data node 131.

Those skilled in the art will also appreciate that the units in the subscriber's data node 131 mentioned above may refer to a combination of analog and digital circuits, and/or one or more processors configured with software and/or firmware, e.g. stored in the subscriber's data node 131 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 890 comprises instructions, which when executed by the respective at least one processor 850, cause the at least one processor 850 of the subscriber's data node 131 to perform the actions above.

In some embodiments, a carrier 895 comprises the computer program 890, wherein the carrier 895 is one of an electronic signal, an optical signal, an electromagnetic signal, a magnetic signal, an electric signal, a radio signal, a microwave signal, or a computer-readable storage medium.

Figure 9A:
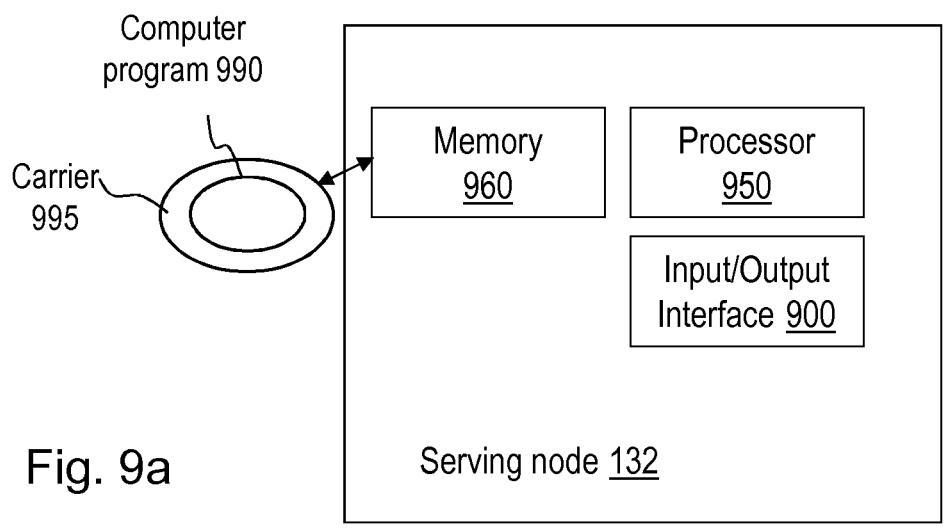
FIGS. 9 a and b are schematic block diagrams illustrating embodiments of a serving node.
Figure 9B:
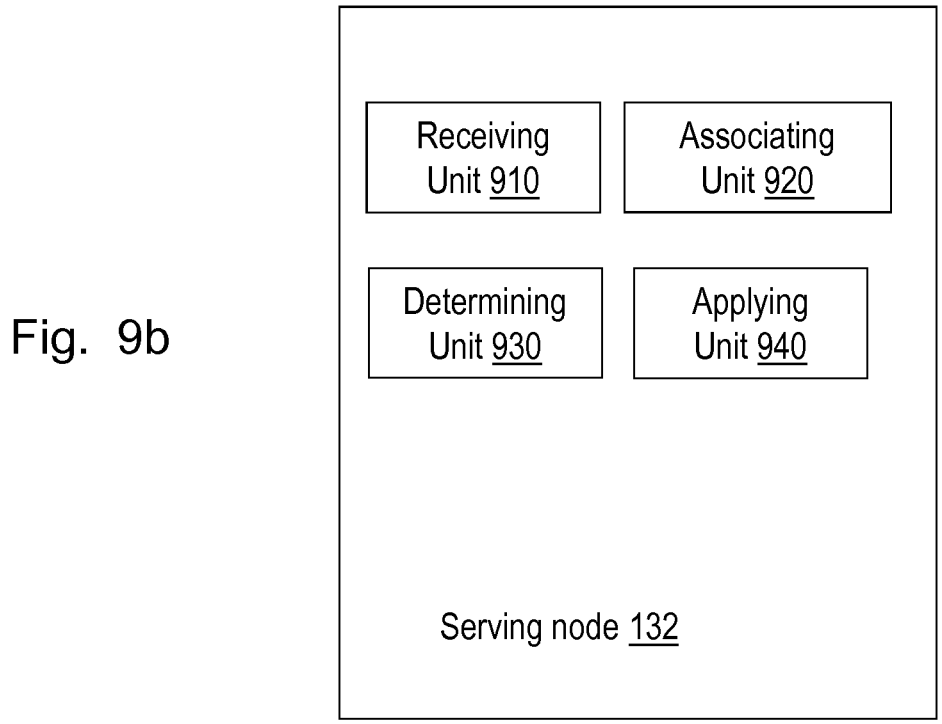

To perform the method actions above for differentiating NIDD traffic in a communication network 100, the serving node 132 may comprise the arrangement depicted in FIGS. 9a and 9b. The communication network 100 is adapted to comprise a subscriber's data node 131, the serving node 132 and an exposure function node 133.

The serving node 132 may comprise an Input and output Interface 900 configured to communicate e.g. with the exposure function node 133. The input and output interface 900 may comprise a wireless receiver (not shown) and a wireless transmitter (not shown).

The serving node 132 is configured to, e.g. by means of a receiving unit 910 in the serving node 132, receive a non-IP flow description from the subscriber's data node 131, wherein the non-IP flow description is adapted to comprise an application identifier and a non-IP flow identifier.

The serving node 132 is configured to, e.g. by means of the receiving unit 910 in the serving node 132, receive, from the exposure function node 133, a corresponding NIDD submission request with non-IP data and a non-IP flow identifier.

The serving node 132 is configured to, e.g. by means of an associating unit 920 in the serving node 132, associate the application identifier and the non-IP flow identifier as an authorized non-IP flow description.

The serving node 132 is configured to, e.g. by means of a determining unit 930 in the serving node 132, determine an application identifier associated with the non-IP flow identifier.

The serving node 132 is configured to, e.g. by means of an applying unit 940 in the serving node 132, apply a non-IP traffic policy configured for the application identifier to the non-IP data.

The non-IP traffic policy may be configured at the serving node 132 per application identifier basis.

The non-IP traffic policy may comprise any one out of: application priority during normal condition, application priority during congestion, buffer size in a communication device 120, QoS information, a time of day to allow or block communication, a rate limit for uplink non-IP data and a rate limit for downlink non-IP data.

The embodiments herein may be implemented through a respective processor or one or more processors, such as a processor 950 of a processing circuitry in the serving node 132 depicted in FIG. 9a, together with a respective computer program code for performing the functions and actions of the embodiments herein. The program code mentioned above may also be provided as a computer program product, for instance in the form of a data carrier carrying computer program code for performing the embodiments herein when being loaded into the serving node 132. One such carrier may be in the form of a CD ROM disc. It is however feasible with other data carriers such as a memory stick. The computer program code may furthermore be provided as pure program code on a server and downloaded to the serving node 132.

The serving node 132 may further comprise a memory 960 comprising one or more memory units to store data on. The memory comprises instructions executable by the processor 950. The memory 960 is arranged to be used to store e.g. application data, threshold values, data packets, events, data, configurations and applications to perform the methods herein when being executed in the serving node 132.

Those skilled in the art will also appreciate that the units in the serving node 132 mentioned above may refer to a combination of analog and digital circuits, and/or one or more processors configured with software and/or firmware, e.g. stored in the serving node 132 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 990 comprises instructions, which when executed by the respective at least one processor 950, cause the at least one processor 950 of the serving node 132 to perform the actions above.

In some embodiments, a carrier 995 comprises the computer program 990, wherein the carrier 995 is one of an electronic signal, an optical signal, an electromagnetic signal, a magnetic signal, an electric signal, a radio signal, a microwave signal, or a computer-readable storage medium.

Figure 10A:
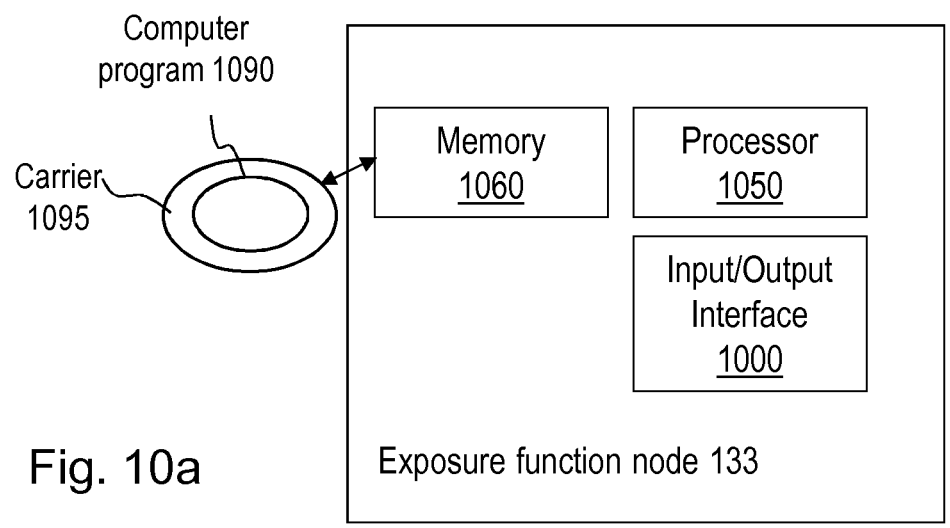
FIGS. 10 a and b are schematic block diagrams illustrating embodiments of an exposure function node.
Figure 10B:
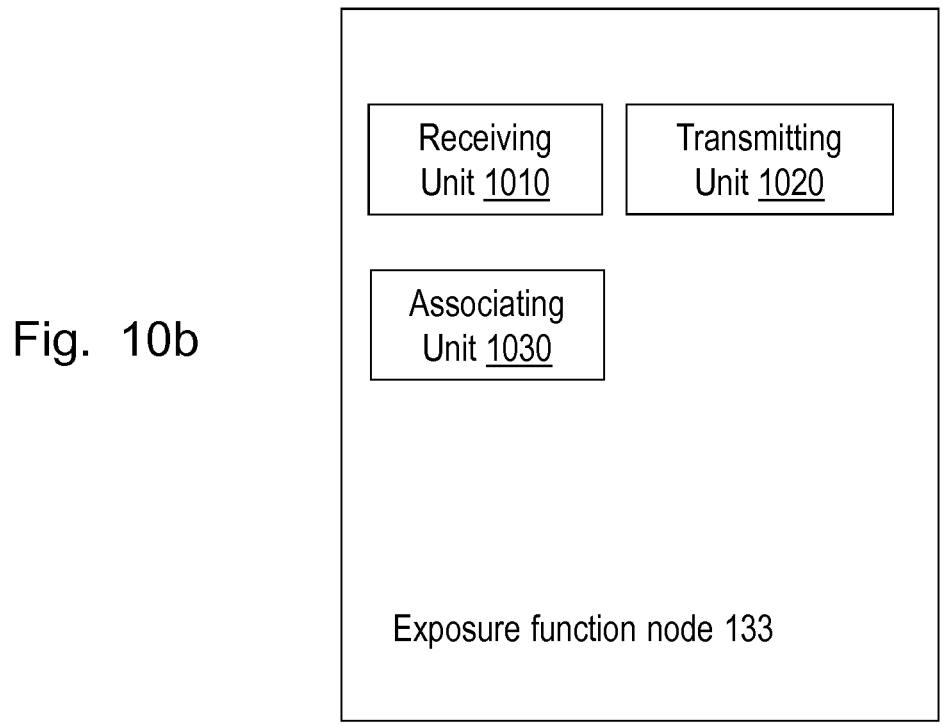

To perform the method actions above for differentiating NIDD traffic in a communication network 100, the exposure function node 133 may comprise the arrangement depicted in FIGS. 10a and 10b. The communication network 100 is adapted to comprise a subscriber's data node 131, a serving node 132 and the exposure function node 133.

The exposure function node 133 may comprise an Input and output Interface 1000 configured to communicate e.g. with the subscriber's data node 131. The input and output interface 1000 may comprise a wireless receiver (not shown) and a wireless transmitter (not shown).

The exposure function node 133 is configured to, e.g. by means of a receiving unit 1010 in the exposure function node 133, receive, from an application node 134, a NIDD configuration request comprising a first identifier, which first identifier is adapted to comprise any one out of a service capability server identifier, an application server identifier and an application function identifier.

The exposure function node 133 is configured to, e.g. by means of the receiving unit 1010 in the exposure function node 133, receive, from the subscriber's data node 131, a NIDD authorization response comprising a non-IP flow identifier.

The exposure function node 133 is configured to, e.g. by means of the receiving unit 1010 in the exposure function node 133, receive, from the application node 134, a NIDD submission request with non-IP data and the first identifier.

The application node 134 may be adapted to be a third party node not belonging to the communication network 100.

The exposure function node 133 is configured to, e.g. by means of a transmitting unit 1020 in the exposure function node 133, transmit a NIDD authorization request comprising the first identifier towards the subscriber's data node 131.

The exposure function node 133 is configured to, e.g. by means of the transmitting unit 1020 in the exposure function node 133, transmit, towards the serving node 132, a corresponding NIDD submission request with the non-IP data and the non-IP flow identifier associated with the first identifier.

According to some embodiments, the exposure function node 133 is further configured to, e.g. by means of the transmitting unit 1020, transmit, towards the application node 134, a NIDD configuration response.

The exposure function node 133 is configured to, e.g. by means of an associating unit 1030 in the exposure function node 133, associate the non-IP flow identifier received in the NIDD authorization response with the first identifier transmitted in the NIDD authorization request.

The embodiments herein may be implemented through a respective processor or one or more processors, such as a processor 1050 of a processing circuitry in the exposure function node 133 depicted in FIG. 10a, together with a respective computer program code for performing the functions and actions of the embodiments herein. The program code mentioned above may also be provided as a computer program product, for instance in the form of a data carrier carrying computer program code for performing the embodiments herein when being loaded into the exposure function node 133. One such carrier may be in the form of a CD ROM disc. It is however feasible with other data carriers such as a memory stick. The computer program code may furthermore be provided as pure program code on a server and downloaded to the exposure function node 133.

The exposure function node 133 may further comprise a memory 1060 comprising one or more memory units to store data on. The memory comprises instructions executable by the processor 1050. The memory 1060 is arranged to be used to store e.g. application data, threshold values, data packets, events, data, configurations and applications to perform the methods herein when being executed in the exposure function node 133.

Those skilled in the art will also appreciate that the units in the exposure function node 133 mentioned above may refer to a combination of analog and digital circuits, and/or one or more processors configured with software and/or firmware, e.g. stored in the exposure function node 133 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 1090 comprises instructions, which when executed by the respective at least one processor 1050, cause the at least one processor 950 of the exposure function node 133 to perform the actions above.

In some embodiments, a carrier 1095 comprises the computer program 1090, wherein the carrier 1095 is one of an electronic signal, an optical signal, an electromagnetic signal, a magnetic signal, an electric signal, a radio signal, a microwave signal, or a computer-readable storage medium.

Further Extensions and Variations

Figure 11:
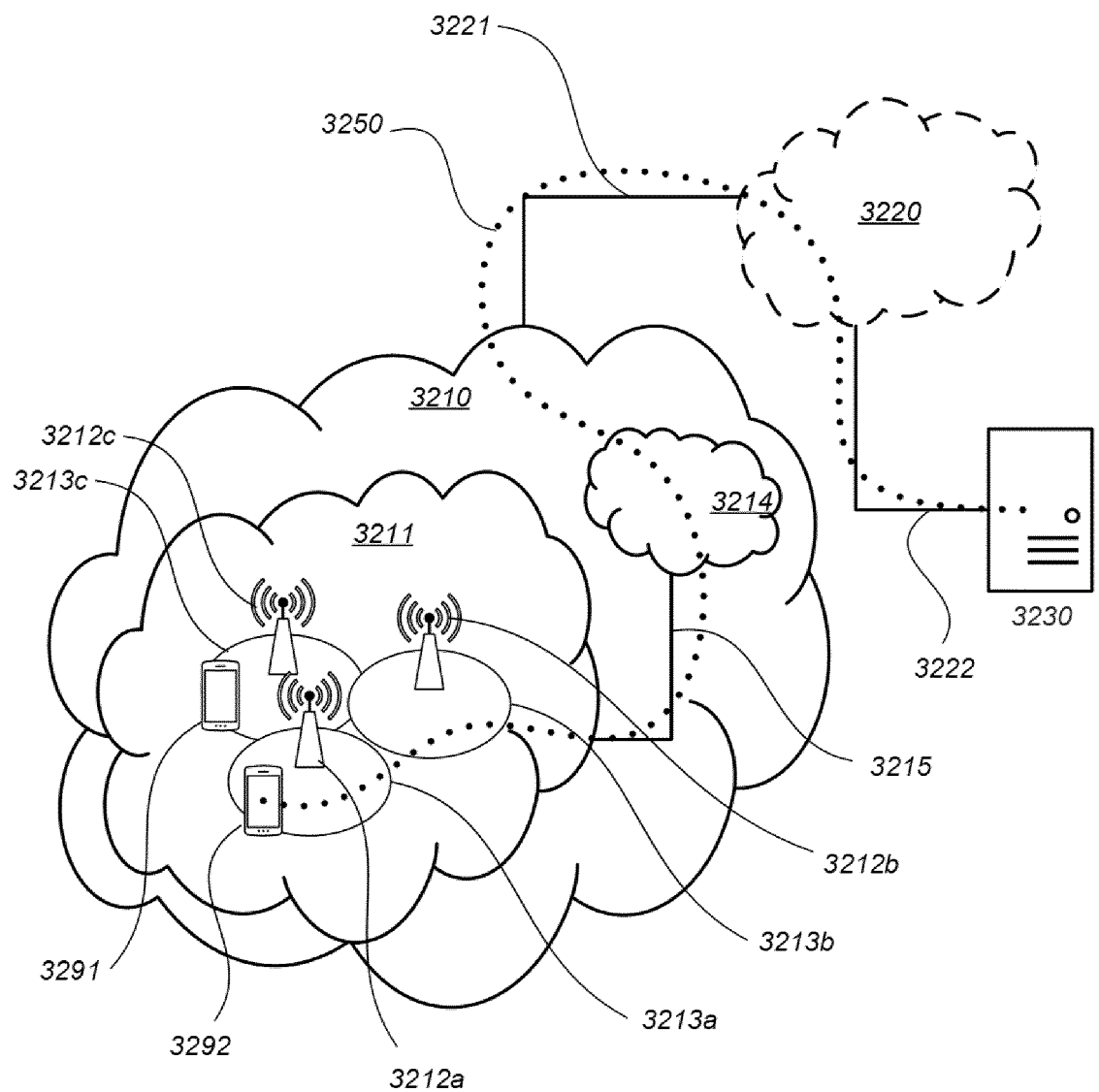
FIG. 11 schematically illustrates a telecommunication network connected via an intermediate network to a host computer.

With reference to FIG. 11, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the radio network node 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the wireless devices 120 such as a Non-AP STA 3291 located in coverage area 3213c is configured to wirelessly connect to, or be paged by, the corresponding base station 3212c. A second UE 3292 e.g. the first or second radio node 110, 120 or such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
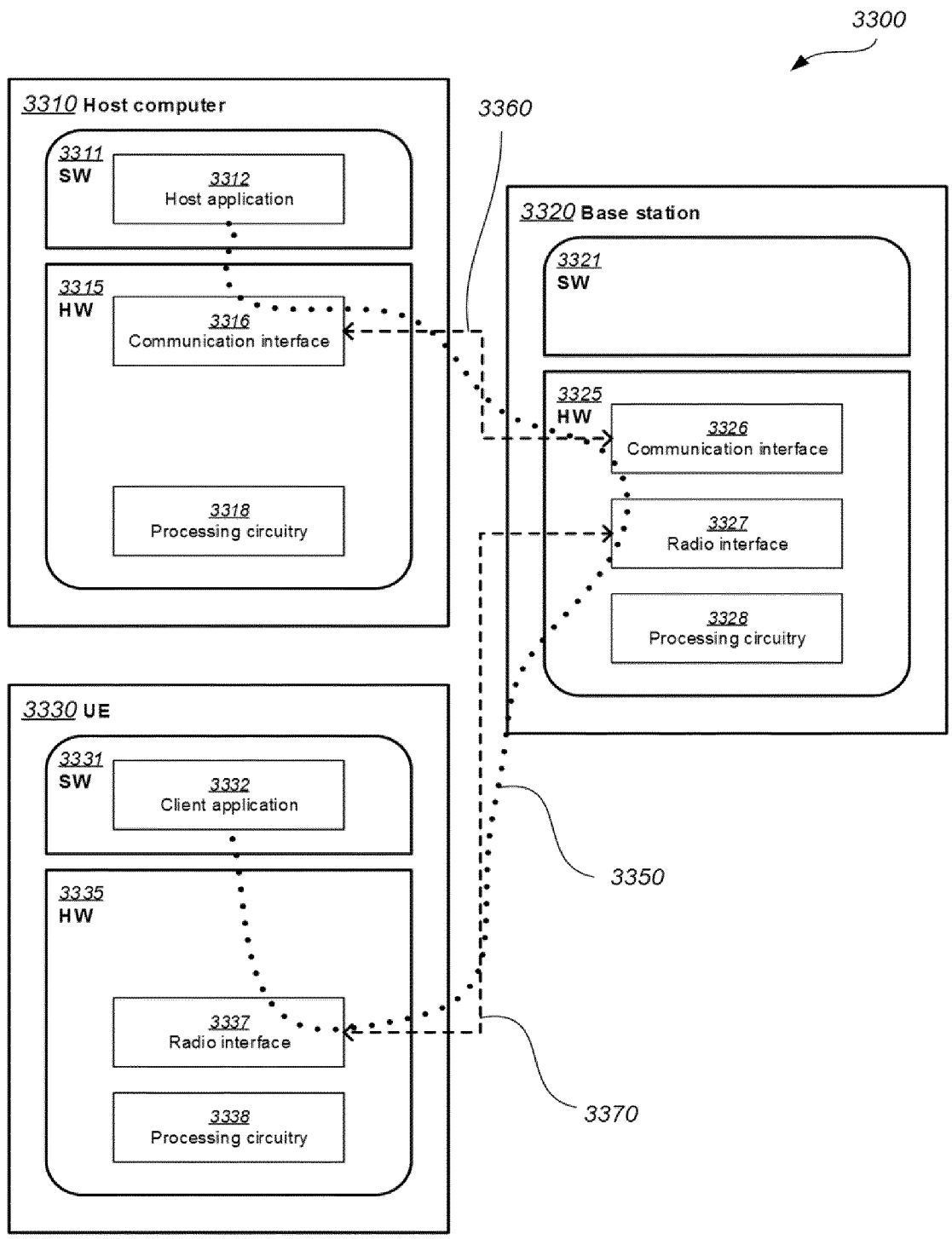
FIG. 12 is a generalized block diagram of a host computer communicating via a base station with a user equipment over a partially wireless connection.

It is noted that the host computer 3310, base station 3320 and UE 3330 illustrated in FIG. 12 may be identical to the host computer 3230, one of the base stations 3212a, 3212b, 3212c and one of the UEs 3291, 3292 of FIG. 11, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 13 is a flowchart illustrating a method implemented in a communication system, in accordance with one embodiment. The communication system includes a host computer, a base station such as an AP STA, and a UE such as a Non-AP STA which may be those described with reference to FIG. 11 and FIG. 12. For simplicity of the present disclosure, only drawing references to FIG. 13 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 14 is a flowchart illustrating a method implemented in a communication system, in accordance with one embodiment. The communication system includes a host computer, a base station such as an AP STA, and a UE such as a Non-AP STA which may be those described with reference to FIG. 11 and FIG. 12. For simplicity of the present disclosure, only drawing references to FIG. 14 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 15 is a flowchart illustrating a method implemented in a communication system, in accordance with one embodiment. The communication system includes a host computer, a base station such as an AP STA, and a UE such as a Non-AP STA which may be those described with reference to FIG. 11 and FIG. 12. For simplicity of the present disclosure, only drawing references to FIG. 15 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station such as an AP STA, and a UE such as a Non-AP STA which may be those described with reference to FIG. 11 and FIG. 12. For simplicity of the present disclosure, only drawing references to FIG. 16 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a subscriber's data node, for differentiating Non-IP Data Delivery, NIDD, traffic in a communication network, wherein the communication network comprises the subscriber's data node, a serving node and an exposure function node, the method comprising:
   receiving, from the exposure function node, a NIDD authorization request comprising a first identifier, which first identifier comprises any one out of a service capability server identifier, an application server identifier and an application function identifier;
   generating a non-IP flow description, based on the received first identifier, wherein the non-IP flow description comprises an application identifier and a non-IP flow identifier for the NIDD authorization, wherein the application identifier is not received from the exposure function node;
   transmitting the non-IP flow description, towards the serving node; and
   transmitting a NIDD authorization response comprising the non-IP flow identifier, towards the exposure function node, wherein the application identifier is not transmitted to the exposure function node,
   wherein the application identifier is derived at the subscriber's data node from a communication provider information on a configurable basis, wherein the application identifier is different than the communication provider information and the application identifier is derivable from each of a plurality of different communication provider information,
   wherein the serving node is a Session Management Function (SMF),
   wherein the subscriber's data node is a Unified Data Management (UDM),
   wherein the first identifier and the non-IP flow identifier are different values, and
   wherein the non-IP flow identifier is a globally unique identifier in the communication network.

2. A non-transitory computer readable medium comprising instructions, which when executed by a processor of a subscriber's data node, cause the processor to perform a method for differentiating Non-IP Data Delivery, NIDD, traffic in a communication network, wherein the communication network comprises the subscriber's data node, a serving node and an exposure function node, the method comprising:
   receiving, from the exposure function node, a NIDD authorization request comprising a first identifier, which first identifier comprises any one out of a service capability server identifier, an application server identifier and an application function identifier;
   generating a non-IP flow description, based on the received first identifier, wherein the non-IP flow description comprises an application identifier and a non-IP flow identifier for the NIDD authorization, wherein the application identifier is not received from the exposure function node;
   transmitting the non-IP flow description, towards the serving node; and
   transmitting a NIDD authorization response comprising the non-IP flow identifier, towards the exposure function node, wherein the application identifier is not transmitted to the exposure function node,
   wherein the application identifier is derived at the subscriber's data node from a communication provider information on a configurable basis, wherein the application identifier is different than the communication provider information and the application identifier is derivable from each of a plurality of different communication provider information, wherein the serving node is a Session Management Function (SMF), wherein the subscriber's data node is a Unified Data Management (UDM), wherein the first identifier and the non-P flow identifier are different values, and wherein the non-IP flow identifier is a globally unique identifier in the communication network.

3. A method performed by a serving node, for differentiating Non-IP Data Delivery, NIDD, traffic in a communication network, wherein the communication network comprises a subscriber's data node, the serving node and an exposure function node, the method comprising:

receiving a non-IP flow description from the subscriber's data node, wherein the non-IP flow description comprises an application identifier and a non-IP flow identifier;

associating the application identifier and the non-IP flow identifier as an authorized non-IP flow description;

receiving, from the exposure function node, a corresponding NIDD submission request with non-IP data and a non-IP flow identifier;

determining an application identifier associated with the non-IP flow identifier; and applying a non-IP traffic policy configured for the application identifier to the non-IP data, wherein the application identifier is derived from a communication provider information on a configurable basis, wherein the application identifier is different than the communication provider information and the application identifier is derivable from each of a plurality of different communication provider information, wherein the application identifier is not known by the exposure function node, wherein the serving node is a Session Management Function (SMF), wherein the subscriber's data node is a Unified Data Management (UDM), and wherein the non-IP flow identifier is a globally unique identifier in the communication network.

4. The method of claim 3, wherein the non-IP traffic policy is configured at the serving node per application identifier basis.

5. The method of claim 3, wherein the non-IP traffic policy comprises application priority during normal condition.

6. The method of claim 3, wherein the non-IP traffic policy comprises application priority during congestion.

7. The method of claim 3, wherein the non-IP traffic policy comprises buffer size in a communication device.

8. The method of claim 3, wherein the non-IP traffic policy comprises a time of day to allow or block communication.

9. The method of claim 3, wherein the non-IP traffic policy comprises a rate limit for uplink non-IP data.

10. The method of claim 3, wherein the non-IP traffic policy comprises a rate limit for downlink non-IP data.

11. A non-transitory computer readable medium comprising instructions, which when executed by a processor of a serving node, cause the processor to perform a method for differentiating Non-IP Data Delivery, NIDD, traffic in a communication network, wherein the communication network comprises a subscriber's data node, the serving node and an exposure function node, the method comprising:

receiving a non-IP flow description from a subscriber's data node in a communication network, wherein the non-IP flow description comprises an application identifier and a non-IP flow identifier;

associating the application identifier and the non-IP flow identifier as an authorized non-IP flow description;

receiving, from the exposure function node, a corresponding NIDD submission request with non-IP data and a non-IP flow identifier;

determining an application identifier associated with the non-IP flow identifier; and applying a non-IP traffic policy configured for the application identifier to the non-IP data, wherein the application identifier is derived from a communication provider information on a configurable basis, wherein the application identifier is different than the communication provider information and the application identifier is derivable from each of a plurality of different communication provider information, wherein the application identifier is not known by the exposure function node, wherein the serving node is a Session Management Function (SMF), wherein the subscriber's data node is a Unified Data Management (UDM), and wherein the non-IP flow identifier is a globally unique identifier in the communication network.

* * * * *